(12) United States Patent
Dumanski et al.

(10) Patent No.: US 10,197,153 B2
(45) Date of Patent: Feb. 5, 2019

(54) DEVICE FOR POSITIONING MESHING TEETH OF A GEAR DRIVE WITHOUT ANY PLAY

(71) Applicants: Miba Sinter Austria GmbH, Laakirchen (AT); Metaldyne International Deutschland GmbH, Dieburg (DE)

(72) Inventors: Christian Dumanski, Plesching-Steyregg (AT); Martin Viechtbauer, Vorchdorf (AT); Juergen Depp, Michelstadt (DE)

(73) Assignees: Miba Sinter Austria GmbH, Laarkirchen (AT); Metaldyne International Deutschland GmbH, Dieburg (DE)

(*) Notice: Subject to any disclaimer, the term of this patent is extended or adjusted under 35 U.S.C. 154(b) by 0 days.

(21) Appl. No.: 15/191,607

(22) Filed: Jun. 24, 2016

(65) Prior Publication Data

US 2016/0377172 A1    Dec. 29, 2016

(30) Foreign Application Priority Data

Jun. 25, 2015  (AT) ............... A 50548/2015

(51) Int. Cl.
*F16H 57/12*    (2006.01)
*F16H 55/18*    (2006.01)

(52) U.S. Cl.
CPC ............ *F16H 57/12* (2013.01); *F16H 55/18* (2013.01); *F16H 2057/126* (2013.01)

(58) Field of Classification Search
CPC ..... F16H 57/12; F16H 55/18; F16H 2057/126
See application file for complete search history.

(56) References Cited

U.S. PATENT DOCUMENTS 2,061,684 A * 11/1936 Spence, Jr. ............. F16H 55/18
74/440
2,845,809 A * 8/1958 Hetzel .................... F16H 55/18
29/463

(Continued)

FOREIGN PATENT DOCUMENTS

AT          507 071 B1    2/2010
DE   10 2004 058101 A1    6/2006

(Continued)

*Primary Examiner* — Zakaria Elahmadi
(74) *Attorney, Agent, or Firm* — Collard & Roe, P.C.

(57) ABSTRACT

The invention relates to a device (4) for positioning meshing teeth (3, 8, 9) of a gear drive without any play, comprising a gear assembly (5), which gear assembly (5) comprises a main gear (6) having first teeth (8) and a gear (7) that is rotatable relative thereto in the circumferential direction having second teeth (9), and the main gear (6) comprises a hub part (10) on which the rotatable gear (7) is disposed, and a tolerance compensating element (12) comprising a shaft part (13) and a compensating part (14) is disposed radially underneath the main gear (6), and the compensating part (14) is connected to the shaft part (13) and to the hub part (10) of the main gear (6) so that the main gear (6) is connected exclusively via the compensating part (14) to the shaft part (13), and the compensating part (14) is made at least partially from a rubber elastic material.

6 Claims, 1 Drawing Sheet

(56) References Cited

U.S. PATENT DOCUMENTS

| | | | | |
|---|---|---|---|---|
| 3,174,356 | A * | 3/1965 | Michalec | F16H 55/18 74/409 |
| 4,660,432 | A * | 4/1987 | Damas | F16H 55/18 464/85 |
| 4,700,582 | A * | 10/1987 | Bessette | F16H 55/14 74/409 |
| 4,920,828 | A * | 5/1990 | Kameda | B60K 17/3467 475/159 |
| 5,813,335 | A * | 9/1998 | Burke | B41F 13/012 101/177 |
| 5,927,149 | A | 7/1999 | Moody | |
| 6,354,395 | B1 * | 3/2002 | Cheng | B62D 5/0409 180/444 |
| 6,615,683 | B1 * | 9/2003 | Voigt | F16H 55/18 74/395 |
| 8,621,951 | B2 * | 1/2014 | Meier | F16D 1/116 74/409 |
| 9,010,209 | B2 * | 4/2015 | Murphy | F16H 55/18 123/90.31 |
| 2002/0121152 | A1 * | 9/2002 | White | F16H 55/18 74/445 |
| 2004/0200302 | A1 * | 10/2004 | Kampichler | F16H 55/18 74/409 |
| 2008/0141811 | A1 | 6/2008 | Sandner | |
| 2010/0050799 | A1 * | 3/2010 | Brackney | F16H 55/18 74/409 |
| 2010/0139431 | A1 * | 6/2010 | Park | F16H 55/18 74/409 |
| 2010/0242649 | A1 * | 9/2010 | Vandewal | F16H 55/18 74/409 |
| 2010/0326223 | A1 * | 12/2010 | Lang | F16H 55/14 74/409 |
| 2011/0030489 | A1 * | 2/2011 | Chen | F16H 55/18 74/409 |
| 2013/0112027 | A1 * | 5/2013 | Buchleitner | F16H 55/18 74/440 |
| 2013/0199323 | A1 * | 8/2013 | Fong | F16H 55/18 74/409 |
| 2014/0190442 | A1 * | 7/2014 | Saito | F16H 55/18 123/192.2 |
| 2014/0216190 | A1 * | 8/2014 | Dickinger | F16H 55/18 74/409 |
| 2014/0224053 | A1 * | 8/2014 | Buchleitner | F16H 55/17 74/445 |
| 2014/0360297 | A1 * | 12/2014 | Yamauchi | F16H 57/12 74/409 |
| 2014/0360300 | A1 * | 12/2014 | Viechtbauer | F16H 55/18 74/445 |
| 2015/0053031 | A1 * | 2/2015 | Willcox | F16H 1/20 74/409 |
| 2015/0226304 | A1 * | 8/2015 | Dumanski | F16H 55/17 74/440 |
| 2015/0316135 | A1 * | 11/2015 | Schnolzer | F16H 55/18 74/440 |
| 2015/0316136 | A1 * | 11/2015 | Schnolzer | F16H 55/18 74/409 |
| 2016/0033030 | A1 * | 2/2016 | Palfai | F16H 57/12 74/409 |
| 2016/0138697 | A1 * | 5/2016 | Kancherla | F16H 55/18 74/409 |

FOREIGN PATENT DOCUMENTS

| | | |
|---|---|---|
| DE | 10 2005 032595 B3 | 12/2006 |
| JP | S64-36755 U | 3/1989 |
| WO | 2005/090829 A1 | 9/2005 |
| WO | 2005/090830 A1 | 9/2005 |

* cited by examiner

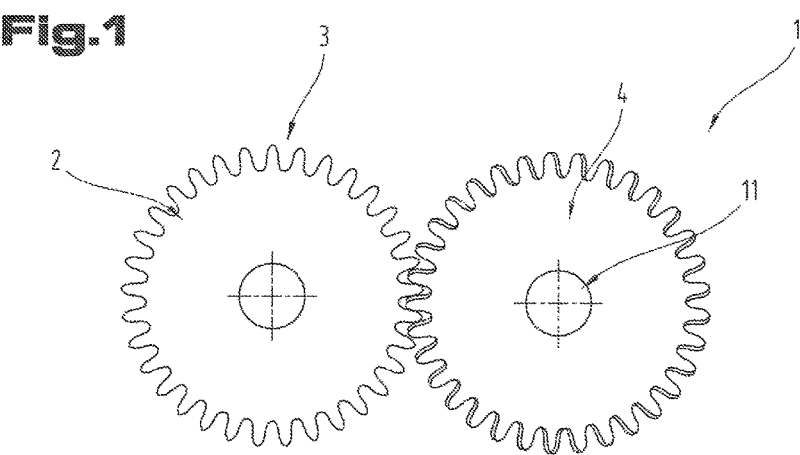
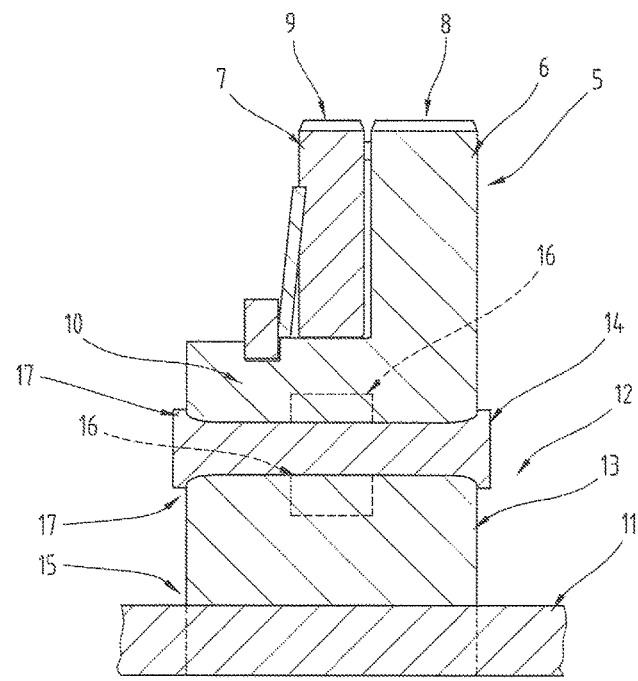

DEVICE FOR POSITIONING MESHING TEETH OF A GEAR DRIVE WITHOUT ANY PLAY

CROSS REFERENCE TO RELATED APPLICATIONS

Applicants claim Priority under 35 U.S.C. § 119 of Austrian Application No. A 50548/2015 filed on Jun. 25, 2015, the disclosure of which is incorporated by reference.

The invention relates to a device for positioning meshing teeth of a gear drive without any play, comprising a gear assembly, which gear assembly comprises a main gear having first teeth and a gear rotatable relative thereto in the circumferential direction having second teeth, the main gear having a hub part on which the rotatable gear is disposed. The invention further relates to a spur gear drive comprising at least a first gear and a device for positioning meshing teeth meshing with this gear without any play, and the first gear is non-split.

Gear assemblies of this type, such as those known from WO 2005/090830 A1 or WO 2005/090829 A1 for example, are used to reduce tooth backlash between two meshing gears. In spur gear drives which generate high torsional vibration and high deflection of the shafts, the circumferential backlash must be relatively large to enable the gear assembly to cope with these conditions.

The objective of the invention is to propose a no-play positioning device for spur gear drives generating high torsional vibration and high deflection of the shafts.

This objective is achieved by the invention on the basis of the device mentioned above, wherein a tolerance compensating element comprising a shaft part and a compensating part is disposed radially underneath the main gear, and the compensating part is connected to the shaft part and to the hub part of the main gear so that the main gear is connected to the shaft part exclusively via the compensating part, and the compensating part is made at least partially from a rubber elastic material. The objective is also achieved by the invention on the basis of the spur gear drive outlined above, wherein the no-play positioning device is as described above.

The advantage of this is that due to the elastic properties of the compensating part, torsional vibrations and deflections of the shaft can be better compensated and damped. It is therefore possible to fit spur gear drives with gear assemblies which have a very high axial tolerance in the range of ±0.5 mm. In standard spur gear drives, the axial tolerance is typically within the range of ±0.15 mm. Further more, with this no-play positioning device, a reduction in circumferential backlash was also obtained due to the compensating part, as a result of which the meshing engagement of other teeth in the teeth of the gear assembly can be improved. As an additional knock-on effect, a reduction in noise emission of the meshing teeth during operation was also observed. With this no-play positioning device, it is also possible to provide the spur gear drive with protection against overload.

Based on one embodiment of the no-play positioning device, the compensating part is connected to the shaft part and/or to the hub part by means of a positively bonded (material bonded) and/or positively fitting (form fitting) connection. This enables a firmer connection to be obtained between the compensating part and the shaft part and/or between the compensating part and the hub part, thereby better preventing the risk of the compensating part being torn off, even when the compensating part is subjected to higher dynamic loads due to torsional vibrations and deflection of the shaft.

To provide a clearer understanding, the invention will be described in more detail below with reference to the appended drawings.

These are simplified schematic diagrams illustrating the following:

FIG. 1 a spur gear drive;

FIG. 2 a cross-section illustrating a detail of a no-play positioning device.

Firstly, it should be pointed out that the positions chosen for the purposes of the description, such as top, bottom, side, etc., relate to the drawing specifically being described and can be transposed in terms of meaning to a new position when another position is being described.

FIG. 1 is a schematic illustration of a spur gear drive 1. In a known manner, it comprises at least a first gear 2 and at least a second gear which engages in a meshing arrangement with the first gear 2. To this end, the first gear 2 has gear teeth 3 on a radially outer circumference.

The first gear 2 is a non-split gear 2, i.e. is made as an integral part from a metal sintered material or a solid metal, for example by means of a casting process.

The second gear meshing with the first gear 2 is formed by a device 4, illustrated in more detail in FIG. 2, for positioning the gear teeth 3 of the first gear 2 meshing with the teeth of the device 4 without any play.

The no-play positioning device 4 comprises a gear assembly 5. The gear assembly 5 comprises a main gear 6, which is made from metal in particular, and a gear 7 which is rotatable in the circumferential direction relative thereto, in particular made from metal. The latter may also be termed a gear rim.

On its end face, the main gear 6 has first teeth 8. On its end face, the rotatable gear 7 has second teeth 9. The second teeth 9 are not disposed in alignment with the first teeth 8 of the main gear 6 in the axial direction.

The main gear 6 additionally comprises a hub part 10 on which the rotatable gear 7 is disposed. The hub part 10 is preferably made integrally with the rest of the main gear 6, i.e. the main gear 6 is preferably of an integral design.

The rotatable gear 7 is pre-tensioned against the main gear 6 in the circumferential direction by means of at least one spring element, for example an Ω-spring, not illustrated. To this end, co-operating cams may be provided on mutually facing surfaces of the main gear 6 and rotatable gear 7 on which the spring element is supported.

Such a gear assembly 5 is illustrated in FIG. 1 of AT 507 071 B1, for example.

At this stage, it should be pointed out that in addition to using an Ω-spring, there are also other possible ways of pre-tensioning the rotatable gear 7 on the main gear 6, for example by means of elastomeric spring elements, etc. The gear assembly 5 is therefore not restricted to the use or provision of the Ω-spring for this purpose.

By contrast with conventional gear assemblies, the gear assembly 5 is not mounted directly on a shaft 11. A tolerance compensating element 12 is disposed between the gear assembly 5 and the shaft 11, concentrically with the main gear 6.

The tolerance compensating element 12 comprises or consists of a shaft part 13 and a compensating part 14.

The shaft part 13 has a recess 15 for receiving the shaft 11 in a non-rotating arrangement. The shaft part 13 is preferably made from a metal material, in particular a sintered material.

It should be noted at this stage that the main gear 6 and/or the rotatable gear 7 is respectively are also made from a sintered material.

The compensating part 14 is made at least partially, but preferably entirely, from at least one rubber elastic material, in particular an elastomer. The elastomer may be selected from for example, a group comprising or consisting of an (X)NBR ((carboxylated) acrylonitrile butadiene rubber), HNBR (hydrated nitrile rubber), a silicone rubber (VMQ), NR (natural rubber), EPDM (ethylene propylene diene rubber), CR (chloroprene rubber), SBR (styrene butadiene rubber), and mixtures thereof.

By "at least partially" is meant that, for example, stiffening elements may be incorporated in the compensating part 14, for example such as fibers and/or filaments, for example made from metal, plastic, natural fibers, etc., or rods, etc.

The compensating part 14 is connected on the one hand to the shaft part 13 and on the other hand to the main gear 6. As a result, the gear assembly 5 is connected exclusively via the main gear 6 to the tolerance compensating element 12 via the compensating part 14. The compensating part 14 is preferably connected to the shaft part 13 and/or to the hub part 10 of the main gear 6 by means of a positively bonded and/or positively fitting connection.

The positively fitting connection may be obtained by means of at least one groove 16 in a radially outer end face of the shaft part 13 and/or a radially inner end face of the main gear 6, as indicated by broken lines in FIG. 2. This being the case, the elastomer of the compensating part 14 extends into the groove 16 and preferably completely fills it.

However, the reverse design would also be possible, in other words a groove is provided in the compensating part 14 into which the shaft part 13 and/or the hub part 10 extends.

Such an (annular) groove may also be provided in at least one of the axial plane surfaces of the shaft part 13 and/or the hub part 10 in the region where the compensating part 14 is in contact with these parts.

The number of grooves 16 and/or their cross-sectional shape may be adapted to the respective requirements. For example, the groove 16 and/or grooves 16 may have a dovetail-shaped cross-section.

Alternatively or in addition, the positively fitting connection of the compensating part 14 to the shaft part 13 and/or to the hub part 10 may also be such that the compensating part 14 has a bigger width in the axial direction of the gear assembly 5 than the shaft part and/or the hub part 10 so that it extends beyond the shaft part 13 and the hub part 10 on either side. The end regions of the compensating part 14 may also have a bigger diameter than a middle region of the compensating part 14 so that the contact surfaces of the compensating part 14 for the shaft part 13 and/or hub part 1 are at least approximately U-shaped, as illustrated in FIG. 2. The compensating part 14 may have an H-shaped cross-section overall. The compensating part 14 may therefore be disposed overlapping the shaft part 13 and/or hub part 10 in certain areas in the respective contact region.

It should be pointed out at this stage that the compensating part 14 extends, in particular continuously, in the axial direction preferably at least across the entire width of the hub part 10 and/or main gear 6 and/or shaft part 13, as viewed in the same direction, as may also be seen from FIG. 2. The compensating part 14 has at least a width corresponding to the width of that one of these parts which has the biggest width, as viewed in the same direction. In particular, however, the compensating part 14 has a width bigger than this width.

The positive connection between the compensating part 14 and shaft part 13 and/or the hub part 10 may be obtained by means of an adhesive or by directly vulcanizing the compensating part 14 onto the shaft part 13 and/or hub part 10.

Based on this design of the no-play positioning device 4, axial tolerances in the range of from −0.5 mm to 0.5 mm are compensated.

With the no-play positioning device 4, it is also possible o set a smaller circumferential backlash.

Based on one embodiment of the no-play positioning device 4, axially outer edges of the shaft part 13 and/or the hub part 10, i.e. the edges in the transition region from a radial surface to axial end faces, are provided with a curvature 21 to 24 with a view to obtaining a better connection of the hub part 10 and/or shaft part 13 to the compensating part 14. In particular, this better prevents the compensating part 13 from being torn off in these transition regions under load.

The radius of the curvature(s) 17 is preferably selected from a range of 0.1 mm to 2 mm, in particular from a range of 0.4 mm to 1.5 mm.

The embodiments illustrated as examples represent possible variants of the no-play positioning device 4, and it should be pointed out at this stage that various combinations of the individual embodiments with one another are also possible.

For the sake of good order, finally, it should be pointed out that, in order to provide a clearer understanding of the structure of the no-play positioning device 4, it and its constituent parts are illustrated to a certain extent out of scale and/or on an enlarged scale and/or on a reduced scale.

LIST OF REFERENCE NUMBERS

1 Spur gear drive
2 Gear
3 Gear teeth
4 Device
5 Gear assembly
6 Main gear
7 Gear
8 Teeth
9 Teeth
10 Hub part
11 Shaft
12 Tolerance compensating element
13 Shaft part
14 Compensating part
15 Recess
16 Groove
17 Curvature

The invention claimed is:

1. Device for positioning meshing teeth of a gear drive without any play, comprising a gear assembly, which gear assembly comprises a main gear having first teeth and a gear that is rotatable relative thereto in the circumferential direction having second teeth,
    wherein the first teeth have a first teeth width in an axial direction, the second teeth have a second teeth width in the axial direction, and the first teeth width is greater than the second teeth width,
    wherein the main gear comprises a hub part and the rotatable gear is disposed directly on the hub part, wherein a tolerance compensating element comprising a shaft part and a compensating part is disposed radially underneath the main gear, wherein the compensating part is connected to the shaft part and to the hub part of the main gear in a manner such that the main gear is connected exclusively via the compensating part to the shaft part, wherein the shaft part of the tolerance compensating element is a part distinct from the main gear and from the rotatable gear, wherein the compensating part is made from a rubber elastic material, and wherein the compensating part extends in the axial direction at least across an entire width of the hub part of the main gear, of the main gear, or of the shaft part in the axial direction.

2. Device according to claim 1, wherein the compensating part is connected to the shaft part and/or to the hub part via a positively bonded and/or positively fitting connection.

3. Spur gear drive comprising at least a first gear and a device for positioning meshing teeth meshing with the first gear without any play, and the first gear is non-split, wherein the no-play positioning device is as defined according to claim 1.

4. Spur gear drive comprising at least a first gear and a device for positioning meshing teeth meshing with the first gear without any play, and the first gear is non-split, wherein the no-play positioning device is as defined according to claim 2.

5. Device for positioning meshing teeth of a gear drive without any play, comprising a gear assembly, which gear assembly comprises a main gear having first teeth and a gear that is rotatable relative thereto in the circumferential direction having second teeth, wherein the first teeth have a first teeth width in an axial direction, the second teeth have a second teeth width in the axial direction, and the first teeth width is greater than the second teeth width, wherein the main gear comprises a hub part and the rotatable gear is disposed directly on the hub part, wherein a tolerance compensating element comprising a shaft part and a compensating part is disposed radially underneath the main gear, wherein the compensating part is connected to the shaft part and to the hub part of the main gear in a manner such that the main gear is connected exclusively via the compensating part to the shaft part, wherein the shaft part of the tolerance compensating element is a part distinct from the main gear and from the rotatable gear, wherein the compensating part is made from a rubber elastic material, wherein the compensating part has a first width extending in the axial direction, and wherein the first width is as large as or larger than a largest of a width of the hub part of the main gear, a width of the main gear, and a width of the shaft part in the axial direction.

6. Device according to claim 5, wherein the first width is larger than the largest of a width of the hub part of the main gear, a width of the main gear, and a width of the shaft part in the axial direction.

\* \* \* \* \*